Patented Sept. 18, 1934

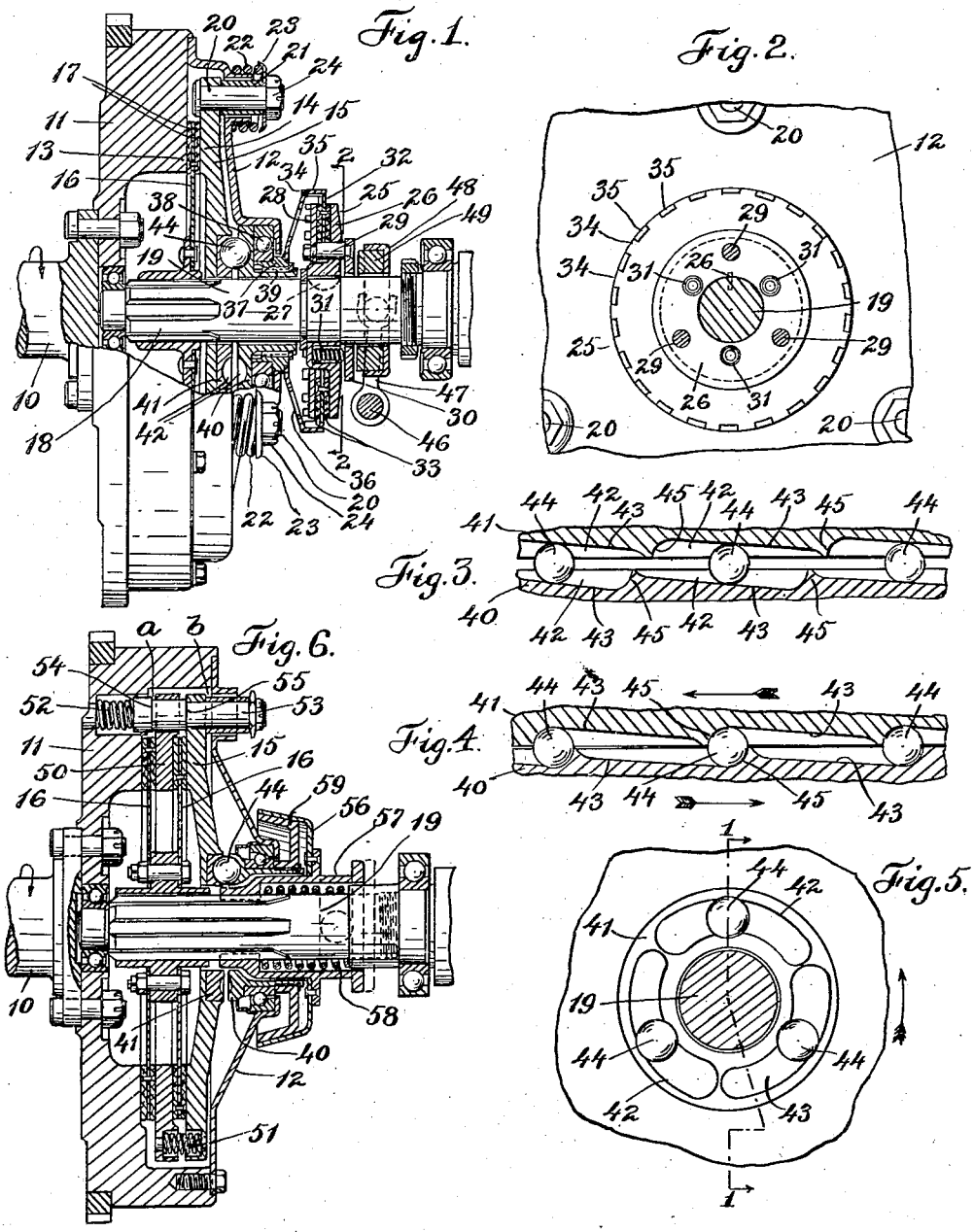
Sept. 18, 1934. C. M. EASON 1,974,390
SERVO CLUTCH
Filed July 8, 1932

1,974,390

UNITED STATES PATENT OFFICE 1,974,390

SERVO CLUTCH

Clarence M. Eason, Waukesha, Wis.

Application July 8, 1932, Serial No. 621,362

9 Claims. (Cl. 192—35)

This invention relates in part to friction clutches having a pilot or servo mechanism for utilizing the relative rotation of driving and driven members of the main clutch to effect the engagement of said clutch, especially when the latter is of the plate or disk type as distinguished from radially-acting shoe or band clutches.

The invention further relates to means for translating rotary into axial motion in clutches, and to the construction of the secondary servo or pilot clutch for use with a disk main clutch and in analogous situations.

One of the principal objects of my invention is to provide a spring-released disk-type servo clutch of simple and axially compact construction in which the servo action, both during engagement and release, will be reliably performed under all conditions and not objectionably influenced by disturbing forces such as centrifugal action. A further object is to provide, for use in such a clutch and analogous situations, an improved anti-friction thrust device for translating the relative rotary movement of the clutch parts into axial clutch-controlling movement. A still further object is to provide an improved construction of the servo unit and its connection with the thrust device. An additional object is to provide improved releasing means in the main clutch when the latter includes more than one driven plate. A further object is to provide in an improved manner for a free-wheeling action of the clutch under certain conditions. Another object is to provide improved means for arresting the spinning action of the driven parts when the main clutch is released.

Of the accompanying drawing, Fig. 1 is a vertical axial section, partly in elevation, showing a preferred embodiment of my improved servo clutch.

Fig. 2 is a transverse section on the line 2—2 of Fig. 1.

Figs. 3 and 4 are sectional developments of the thrust or ball-cam device in the clutch-engaging and releasing positions respectively.

Fig. 5 is a transverse section between the plates of said device.

Fig. 6 is a longitudinal vertical section showing a modification of my invention, with two driven plates in the main clutch.

The invention as illustrated is particularly adapted for automobile use but may be employed in other situations.

Referring at first to Figs. 1 to 5 inclusive, 10 is a driving shaft, such as the crank shaft of an internal combustion engine, to which is secured a flywheel 11 provided on its rear face with a detachable plate 12 forming therewith a closed hollow drum or casing containing the main clutch, the latter including a plane friction face 13 on the rear side of the flywheel body, a similar friction face 14 on the front side of a driving plate or disk 15 which rotates with the flywheel and is movable axially thereon, and a light driven plate or disk 16 having the usual annular friction facings 17 at its outer margin and having its hub splined at 18 to the forward end of the driven shaft 19.

A driving connection is formed between the rear flyweel plate 12 and the driving plate 15 by means of studs 20 attached to said driving plate and surrounded by bushings 21 which pass through guide holes in the plate 12. External springs 22 surrounding the studs 20 bear at their forward ends against the rear side of the plate 12 and at their rear ends against retaining plates 23 held by nuts 24 on the studs 20. These springs have the double function of releasing or opening the main clutch when the pressure of the servo or pilot clutch is removed and of returning or restoring the driven member of the ball cam or thrust device by relative forward rotation as hereinafter described.

The secondary servo or pilot clutch, of novel construction and relation to other parts, is indicated generally at 25 and includes an axially-fixed rear driving plate 26 keyed at 27 to rotate with the driven shaft 19, an axially-movable front driving plate 28 rotatively engaged with said plate 26 by a series of thrust studs 29 attached to the plate 28 and having a sliding fit in apertures in the plate 26, a rear thrust plate 30 fastened to the rear ends of said studs and a series of springs 31 interposed between the plates 26 and 30 for furnishing a yielding pressure to engage or close the secondary clutch, these springs being located in pockets in the hub of the plate 26, alternating in circumferential positions with the studs 29 and located closely adjacent to the inner periphery of said plate. The secondary clutch further includes a driven plate 32 located between the driving plates 26 and 28 and provided with annular friction facings 33. In this form of secondary clutch, the spring thrusts are axially balanced when the clutch is closed, the spring pressures acting freely without producing any binding tendency on the studs 29, and the springs 31 are compactly contained mainly within the hub of the driving plate 26.

The outer periphery of the driven plate 32 of the secondary clutch is connected with the driving member of the thrust unit by a suitable form of flexible coupling, in this case including a cylindrical series of parallel-sided, forwardly-projecting lugs or fingers 34 formed on the plate 32 and a complemental cylindrical series of similar rearwardly-projecting fingers or lugs 35 alternating with the lugs 34 and formed on the outer periphery of a coupling plate 36 welded to a hub sleeve 37 which is surrounded and supported by a radial and end-thrust ball bearing 38 whose outer race is held in or adjacent to the central aperture of the flywheel back plate 12.

The hub sleeve 37 of plate 36 is keyed or splined at 39 to the rearwardly-projecting hub sleeve of the rear or driving plate 40 of a ball-cam thrust device whose forward or driven thrust plate 41 is inset on the rear face of the main-clutch driving plate 15 at the inner margin of the latter.

The acting faces of the plates 40 and 41 are each formed with a series of half-pockets 42 whose bottoms form parallel inclined planes 43 at a small angle, such as 4 or 5 degrees, to a transverse radial plane, and in each pair of half-pockets is contained a single ball 44 to provide an antifriction rolling thrust-transmitting connection between the inclined planes or cam bottoms of the pockets. The pocket formations in the two plates may be exact duplicates of each other, but oppositely directed in the respective plates, with the shallow end of one half-pocket in one plate substantially coinciding with the deep end of the corresponding half-pocket in the other plate in the clutch-engaging position. At the deep end of each half-pocket a retaining abutment 45, substantially equal in depth to half of the ball diameter and conforming to the spherical surface of the ball, is provided to retain the ball 44 against circumferential escape into the adjoining pocket, and when the plates 40, 41 are in their position of nearest approach as indicated in Fig. 4, their adjoining faces are substantially in contact. The half-pockets 42 likewise conform in transverse contour to the curvature of the balls so that the latter are retained against radial displacement.

46 is a rock-shaft having fork arms 47 for imparting axial movement to and preventing rotation of a clutch-controlling thrust collar 48 having in its forward face a ring 49 of carbon or graphite composition for contact with the thrust plate 30 of the secondary clutch to open or release said clutch and also, by its friction against said plate 30, to arrest the spinning of the driven shaft 19 and parts carried thereby and thus to facilitate the shifting of gears in an automobile by acting as a clutch brake. Where this braking or anti-spinning function is not desired, the member 49 can be an ordinary ball-thrust bearing.

Fig. 1 shows the engaged or closed condition of the main and auxiliary clutches, and Figs. 3 and 5 indicate the corresponding condition of the ball-cam unit. In operation, when it is desired to release the main clutch, the control collar 48 is moved forward against the thrust plate 30 of the secondary clutch, compressing the springs 31 and moving the driving plate 28 forwardly away from the driving plate 26 by means of the studs 29. The driven plate 32 of the secondary clutch is thereby released, which permits the driving plate 40 of the thrust unit to be rotated forwardly with respect to the flywheel 11 by the pressure of the springs 22 reacting through the driving main-clutch plate 15, the driven thrust plate 41 and the balls 44, said balls being rolled down the inclined bottoms 43 of the ball-cam plates 40 and 41 until they reach the positions indicated in Fig. 4, the same spring pressure retracting the driving plate 15 and opening or releasing the main clutch.

To close or engage the main clutch, the driven shaft 19 either being at rest or rotating slower than the flywheel 11, the control collar 48 is backed away, permitting the driving plates 26 and 28 of the secondary clutch to close upon the driven plate 32. This imposes a retarding force upon the driving plate 40 of the ball-cam device and moves it relatively to the driven plate 41 toward the position indicated in Fig. 3, the balls 44 rolling up the inclines 43 and separating the plates so that the main-clutch driving plate 15 will be moved forward against the driven plate 16 to clamp the latter between the friction faces 13 and 14. The relative angular movement of the plates 40 and 41 in performing their function is, because of the rolling action of the balls, twice as great for a given axial movement and the same angularity of inclines, as would be the case with mating screws or end-face cams in sliding contact, and of course the friction is far less and the device will operate for a long time without lubrication. A correspondingly smaller secondary clutch friction and spring pressure are required and clutch control is effected with a very light pressure and a control movement of small amplitude on the part of a pedal or the like. Should the spacing of the balls temporarily become unequal, the operation is not affected because each ball is effective for axial thrust at all positions throughout the length of its pocket, but symmetry is restored in the relaxed position of Fig. 4.

It will be observed that the ball-cam unit 40, 41, 44 not only provides a very compact and simple anti-friction thrust unit of the parallel-incline, unit-roller type which in this case replaces the ordinary spring and lever arrangement for closing a clutch of the disk type, but by locating the same on a small diameter radially well within the zone of the friction members 13, 14 and 17 and providing a single ball only in each segment of the ball-cam unit, the servo action is performed with certainty, practically free from the disturbing influence of centrifugal force or the friction of a multiplicity of balls in each segment, during both clutch engagement and release. The friction of the ball-cam device is so slight that the angular advance of its member 40 and the connected secondary clutch member, upon release of the latter, can generally be effected by the pressure of the springs 22 alone, and no auxiliary torsion spring will generally be required for effecting such advance unless in case of an extremely small angle of the cam surfaces 43.

Should the load be so great as to cause the main clutch to slip, the engagement between its friction members will be automatically tightened by retardation of the cam plate 40 with reference to the plate 41, causing the balls 44 to roll farther up their inclines. On the other hand, a freewheeling action by automatic release of the clutch occurs under certain conditions in the use of this clutch on an automobile, as when a sudden negative torque of sufficient magnitude is imposed on the driven shaft 19, causing the driven disk 16 to slip forward between the driving surfaces 13 and 14, thereby angularly advancing the cam plate 40 with relation to the plate 41 and relieving the clutching pressure. This may be accomplished at the will of the driver when the engine has been driving the car at considerable speed, by a sudden closing of the engine throttle, whereupon the drag of the engine, opposed to the momentum of the car, will slip the clutch and automatically effect its release. If, however, the throttle is gradually closed, the clutch will not slip and the engine may be used as a brake in the usual manner.

The modification represented in Fig. 6 is adapted for heavier duty and includes a pair of laterally flexible driven plates 16 in the main clutch, having their inner peripheries bolted to a hub sleeve splined on the driven shaft 19, together with an additional driving ring 50 located between said driven plates forward of the driving plate 15. In this case I provide a series of clutch-releasing springs 51, of which one is shown in the illustration, circumferentially distributed around the clutch, between the driving plate 15 and the driving ring 50 to insure release of the rearmost driven plate 16 when the clutch is disengaged, and a second set of similarly distributed springs 52, of which one is illustrated, contained in pockets in the flywheel 11 and each pressing rearwardly upon a releasing stud 53 which passes through an aperture in the back plate 12 of the flywheel and serves to transmit the drive from said plate to the driving plate 15 and the ring 50. This stud has three diameters, there being a shoulder 54 between the first two diameters for engaging the ring 50 and another shoulder 55 between the second two diameters for engaging the plate 15. When the clutch is engaged, the clearance *a* between the shoulder 54 and the ring 50 is exactly one-half the clearance *b* between the driving plate 15 and the back plate 12. Upon release of the clutch, the springs 51 first separate the driving plate 15 and the driving ring 50 and the springs 52 then separate the driving ring 50 and the driving face on the flywheel 11, so that the clutching pressure is first released from the rear driven plate 16 and then from the forward one.

This modification includes a ball-cam thrust unit 40, 41, 44 of the same type as previously described, but I have shown a modified secondary clutch of the cone type including a female driving cone 56 splined to the driven shaft and having a control collar 57 incorporated therewith and yieldingly projected forward by a light spring 58, together with a male cone 59 keyed to the hub sleeve of the ball-cam driving plate 40. This same cone clutch or any other suitable type could be used for the secondary clutch in Fig. 1 but is somewhat less suitable on account of the unbalanced end pressure of spring 58; or the secondary clutch of Fig. 1 could be used in Fig. 6.

It will be understood that the form of embodiment might be otherwise varied without departing from the scope of my invention as defined in the claims.

I claim:

1. Clutch mechanism comprising a main friction clutch having driving and driven disks relatively biased to an open position, a driven shaft, axial-thrust roller means acting on the inner margin of a driving disk in a zone wholly located radially inward from the zone of the disk friction surfaces and operating by relative retardation of the driven shaft for closing said clutch, a normally-closed secondary friction clutch for operating said thrust means, positioned axially in line with the latter, rearwardly thereof, and control means for opening said secondary clutch.

2. Clutch mechanism comprising a main friction clutch of the disk type having friction surfaces in an outer zone thereof and including an axially-movable driving plate, a driven shaft, anti-friction means exerting axial thrust in one direction of relative rotation only and including a circumferential series of parallel-incline, unit-ball segments acting on the driving plate radially inward from the zone of said friction surfaces and having a member angularly retardable with respect to said driving plate, a secondary friction clutch actuated by the driven shaft for retarding said member, and spring means acting on said driving plate for retracting the latter and angularly advancing said retardable member when said secondary clutch is open.

3. Clutch mechanism comprising a driving drum having a central opening in its rear wall, a main clutch within said drum, biased to a released position, a driven shaft projecting through said opening, a normally-closed secondary friction clutch mounted on the driven shaft rearwardly of said drum for closing the main clutch by relative retardation of the said shaft, control means for opening said secondary clutch, and a roller thrust device acting on the main clutch within said drum and having a member surrounding the driven shaft and angularly movable with respect to the drum, said member having a connection with the secondary clutch, extending through said opening.

4. Clutch mechanism comprising a main friction clutch having driving and driven members, relatively-biased to an open position, and a secondary friction clutch operating by relative retardation of the driven member for closing said main clutch, said secondary clutch having a pair of friction plates one of which is formed with angularly-spaced spring pockets, a thrust ring connected with the other plate by driving and thrust studs passing through apertures in the first plate and alternating in angular spacing with the spring pockets, a third friction plate located between said pair of plates and angularly movable with respect thereto when the secondary clutch is open, and springs in said pockets, interposed between the first-said plate and the thrust ring for yieldingly closing the secondary clutch.

5. Clutch mechanism comprising a driving drum containing a main friction clutch biased to a released position and having a central opening in its rear wall, a driven shaft projecting through said opening, a normally-closed secondary friction clutch mounted on said driven shaft for closing the main clutch by relative retardation of said shaft, said secondary clutch having a pair of driving plates connected to rotate with said driven shaft, a driven plate between said driving plates, means for axially moving one of said driving plates to open the secondary clutch, and a flexible coupling connected with the outer periphery of said driven plate and having a connection extending through said drum opening for operating the main clutch.

6. Clutch mechanism comprising a main friction clutch having a pair of driven disks and driving members engaging opposite sides of said disks and including intermediate and rear driving plates having different degrees of axial movement, spring means interposed between said driving plates for releasing one of the driven disks before the other, additional spring means acting constantly on the rear one of said driving plates and upon the intermediate driving plate after the first spring means has acted for thereafter releasing the other driven disk, a driven shaft connected with said driven disks, and servo means acting by relative retardation of said driven shaft for closing the main clutch.

7. Clutch mechanism comprising a main friction clutch including driven parts substantially free from side thrust, a normally-closed secondary friction clutch for actuating said main clutch, stationarily-mounted control means movable to open said secondary clutch for releasing the main clutch, and a roller-cam axial-thrust unit associated with said secondary clutch and comprising a circumferential series of segments each having a parallel-incline ball pocket containing a single ball which is effective for axial thrust at any point in the length of said pocket for causing the operation of said main clutch.

8. Clutch mechanism comprising a driven shaft, a main friction clutch having a driven member on said shaft and a centrally-apertured driving plate provided with a circumferential series of half-pockets with inclined bottoms at the inner margin of said plate adjacent said shaft, a thrust member immediately surrounding and rotatable with respect to said shaft, rearwardly of said driving plate, and having complemental half-pockets with parallel inclined bottoms, ball-retaining abutments at the deeper ends of the half-pockets, single balls in the pairs of half-pockets, a normally-closed secondary friction clutch located on said shaft rearwardly of said thrust member for rotating the latter to close the main clutch, and stationarily-mounted axial-thrust controlling means for opening said secondary clutch.

9. Clutch mechanism comprising a main friction clutch having a pair of driven disks, a driving ring interposed between said disks, a disk-engaging rear driving plate, releasing spring means interposed between said ring and plate, additional releasing means including a rearwardly spring-pressed pin having a shoulder engaging said rear driving plate and another shoulder of larger diameter normally spaced from said driving ring and adapted to engage the latter for release of the forward driven disk after release of the rear driven disk, a driven shaft connected with said driven disks, and servo means acting by relative retardation of said shaft for closing the main clutch.

CLARENCE M. EASON.